Patented Mar. 18, 1952

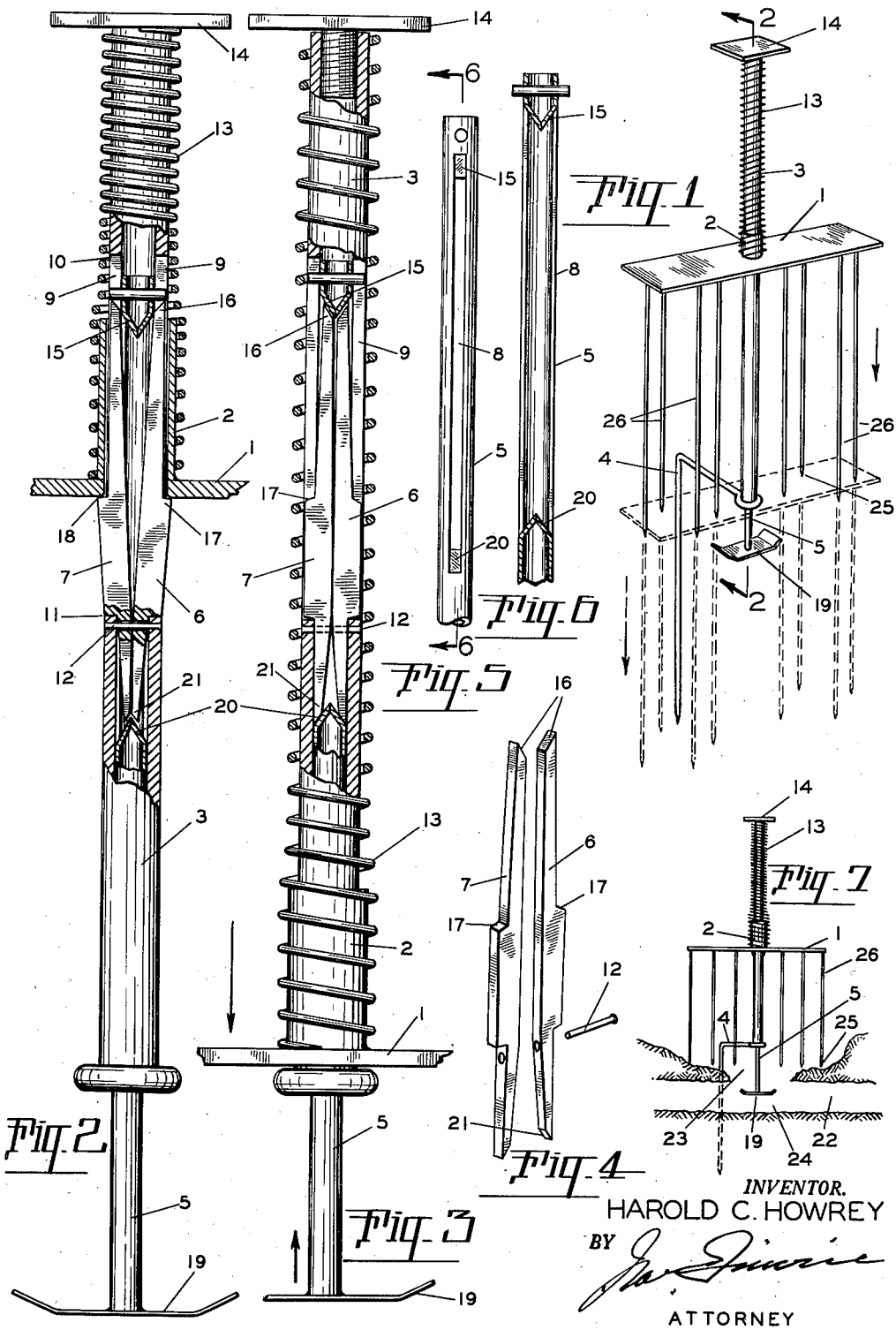

2,589,385

UNITED STATES PATENT OFFICE 2,589,385

ANIMAL TRAP

Harold C. Howrey, Estacada, Oreg.

Application June 15, 1949, Serial No. 99,537

1 Claim. (Cl. 43—80)

This invention relates to animal traps and is particularly adapted to mole traps.

The primary object of the invention is to provide a trigger mechanism for releasing the trap that can be set down into the run-way and operated by the animal without covering the runway with dirt.

It has been found that the animal is attracted to the atmosphere coming through the run-way and will attempt to fill the opening up with dirt. It also has been found that he will attempt to dig under the trigger pan sooner than try to go around or over the same.

A further object of my invention is the provision of a trigger mechanism that is operated with a straight upward movement making the operation of the same effective regardless of which side of the trigger pan the animal tends to raise.

My trap is equally well adapted to be operated over the run-way in what is known as a blind setting, that is placing the trap over the run-way without digging a hole, but pressing the dirt down into the run-way directly under the trigger pan.

My trigger extends down below the tine or teeth of the trap so that the ends of the tines or teeth are well above the trigger pan, thereby insuring a more effective operation of the trap.

These and other incidental objects will be apparent in the drawings, specification and claim.

Referring to the drawings:

Figure 1 is a perspective view of my new and improved trap after the trap has been set, the broken lines indicating the position of the tines of the trap after the same has been sprung.

Figure 2 is a view taken on line 2—2 of Figure 1, partially broken away for convenience of illustrating the trigger mechanism of the trap.

Figure 3 is the same as Figure 2 except that the trigger pan has been raised disconnecting the locking mechanism allowing the trap to spring.

Figure 4 is a perspective view of part of the locking mechanism removed from the trap.

Figure 5 is a fragmentary side view of the trigger operating plunger with the trigger mechanism removed.

Figure 6 is a fragmentary sectional view, taken on line 6—6 of Figure 5, looking in the direction indicated.

Figure 7 illustrates the trap in set position within the run-way.

Referring more specifically to the drawings:

My new and improved animal trap consists of a tine or base plate 1, which has a vertically disposed sleeve 2 forming part thereof and extending upwardly, best illustrated in Figure 2. This sleeve is adapted to receive the tubular member 3, and slides freely on the tubular member.

Fixedly secured to the lower end of the tubular member 3 is a holding stand tine 4, which is adapted to be forced into the ground for holding the trap assembly in a fixed position relative to the run-way of the animal. This stand tine and tube 3 can be rotated about the vertical axis of the trap for avoiding obstructions.

Slidably mounted within the tubular member 3 is a trigger operating plunger 5, in which is located the trigger mechanism consisting of two oppositely disposed bars 6 and 7. These bars are located within the slot 8 of the plunger 5. This slot is best illustrated in Figures 2, 3, 5 and 6. The tubular member 3 also has slots 9 formed therein extending from the point 10 to the point 11, adapted to receive the locking bars 6 and 7. These bars are held within the tubular member 3 by the cross pin 12, the pin passing through the slot 8 of the trigger plunger. Obviously the plunger 5 may comprise a rod but to save weight it is preferably tubular, as shown.

A spring 13 has one of its ends resting on the tine plate 1 and its opposite end under the cap 14, forming part of the tubular member 3. This spring is adapted to force the tine plate 1 into the ground when the trigger mechanism is released. The cap 14 is threadably mounted on the top of the tube 3 and can be adjusted up and down increasing or decreasing the tension of the spring 13.

I will now describe the operation of my new and improved animal trap. The trap is set by grasping the tine bar 1 by the hands of the operator and placing the cap 14 against the knee or chest and pulling the tine bar and sleeve 2 towards the cap 14 and over the member 3 from the position shown in Figure 3 to the position shown in Figure 2. When the tine plate is pulled towards the cap 14 the spring is compressed, and as the spring is compressed the plunger 5 is pulled or moved within the member 3 in the opposite direction causing the wedge portion 15 of the plunger to spread the bars 6 and 7 apart by engaging their upper inclined surfaces 16. The said bars 6 and 7 are pivotally and loosely mounted to the cross pin 12 which is fixedly mounted within the member 3.

When these bars are separated the shoulders 17 engage the under surface of the tine plate 1 at 18. This maintains the spring 13 in a compressed condition holding the tine plate in the position as illustrated in Figure 1 in regards to the tubular member 3 and its associated parts.

The trap is sprung by the animal raising the trigger pan 19 together with the trigger plunger 5 engaging the wedge portion 20 of the plunger with the lower inclined surfaces 21 of the locking bars 6 and 7. This forces their lower ends 21 apart disengaging the shoulders 17 from under the tine plate 1, as illustrated in Figure 3, allowing the said plate to lower to the position shown in Figure 3 and by the broken line position shown in Figure 1.

Referring to Figure 7, it will be noted that the trigger pan 19 drops fairly well down into the run-way 22, while the point 25 of the tines 26 are relatively higher up than the said trigger pan, permitting the pan to be lowered in the run-way, which I have found is the proper way to catch the animal, it being more or less advisable to leave the dug-away portion 23 open so that the animal will sense the atmosphere coming into the run-way, his natural instinct then is to dig under the trigger pan 24 trying to get through, and at the same time filling dirt around the pan.

Although certain specific embodiments of the invention have been shown and described, it is obvious that many modifications thereof are possible. The invention, therefore, is not to be restricted except in so far as is necessitated by the prior art and by the spirit of the appended claim.

What I claim is:

An animal trap comprising a tubular member including means for supporting said member in an upright position, a plate carrying a series of depending tines and slidably mounted on said tubular member, spring means biasing said plate downwardly on said member, a plunger freely slidable within said tubular member, said plunger having an elongated diametrical slot, said tubular member having diametrical slots corresponding to said plunger slot, a pair of trigger elements mounted in said aligned slots and in relative rocking engagement to enable separation of their respective ends, means anchoring said trigger elements to said tubular member against longitudinal movement but permitting said rocking movement, trigger portions projecting laterally from said trigger elements to nest within said tubular member when the lower ends of said trigger elements are separated and to extend beyond the periphery of said tubular member for holding said plate against said spring means when the upper ends of said trigger elements are separated, wedges in the ends of said plunger slot for respectively separating the respective ends of said trigger elements, and a trigger shoe at the lower end of said plunger for lifting said plunger to separate the lower ends of said trigger elements and nest said trigger portions within the tubular member to release said plate.

HAROLD C. HOWREY.

REFERENCES CITED

The following references are of record in the file of this patent:

UNITED STATES PATENTS

| Number | Name | Date |
| --- | --- | --- |
| 374,765 | Waltman | Dec. 13, 1887 |
| 2,249,332 | Smith | July 15, 1941 |